United States Patent [19]
Henderson et al.

[11] Patent Number: 5,935,339
[45] Date of Patent: Aug. 10, 1999

[54] DECONTAMINATION DEVICE AND METHOD THEREOF

[75] Inventors: Eric Henderson, Ames, Iowa; James Vesenka, Fresno, Calif.

[73] Assignee: Iowa State University, Ames, Iowa

[21] Appl. No.: 08/766,871

[22] Filed: Dec. 13, 1996

Related U.S. Application Data

[60] Provisional application No. 60/008,629, Dec. 14, 1995.

[51] Int. Cl.⁶ ........................................................ B08B 7/00
[52] U.S. Cl. .................................................. 134/1; 134/1.1
[58] Field of Search .......................... 422/186.07, 186.05; 134/1.1–1.2, 1.3

[56] References Cited

U.S. PATENT DOCUMENTS

| | | | |
|---|---|---|---|
| 2,822,327 | 2/1958 | Hammesfahr et al. | 422/186.07 |
| 3,526,583 | 9/1970 | Hayward | 422/186.05 |
| 4,910,637 | 3/1990 | Hanna | 422/186.07 |
| 5,194,291 | 3/1993 | D'Aoust et al. | 422/186.05 |
| 5,316,741 | 5/1994 | Sewell et al. | 422/186.07 |
| 5,458,856 | 10/1995 | Marie et al. | 422/186.05 |
| 5,466,424 | 11/1995 | Kusano et al. | 422/186.05 |
| 5,510,624 | 4/1996 | Zaluzec . | |
| 5,545,379 | 8/1996 | Gray | 422/186.07 |
| 5,578,280 | 11/1996 | Kazi et al. | 422/186.07 |

*Primary Examiner*—Jill Warden
*Assistant Examiner*—Alexander Markoff
*Attorney, Agent, or Firm*—Nixon, Hargrave, Devans & Doyle LLP

[57] ABSTRACT

One embodiment of a decontamination device for a surface, such as a probe, and method thereof in accordance with the present invention includes a first electrode, a second electrode, and a transformer. The first electrode comprises a housing with an opening and one end of the second electrode is positioned in the opening. The second electrode has an elongated-shape which tapers to a point at the one end adjacent to the opening. The transformer is mounted in the housing and has first and second pairs of leads. One of the second pair of leads is coupled to the first electrode and the other of the second pair of leads is coupled to the second electrode. A surface to be cleaned is placed adjacent to the point and the device is turned on for a preset period of time to generate free radicals, such as ozone plasma, which remove debris build-up on the surface.

13 Claims, 4 Drawing Sheets

DECONTAMINATION DEVICE AND METHOD THEREOF

This application claims the benefit of U.S. Provisional Application No. 60/008,629, filed Dec. 14, 1995 which is herein incorporated by reference. The present invention relates generally to decontamination devices, and more particularly, to a decontamination device that generates free radicals, such as ozone, to decontaminate a surface, such as a probe.

FIELD OF THE INVENTION

BACKGROUND OF THE INVENTION

An atomic force microscope (AFM) uses a probe in the form of a sharp needle that touches the surface of a sample and generates an image of that surface. In doing so, the probe picks up organic and inorganic debris from the surface and, as it picks up debris, the image resolution is decreased.

Similar types of probes are also used in scanning tunneling microscopes (STM). Like the probes used in AFM, the probes used in STM are often used very close to or touching the surface of a sample as the microscope scans the sample resulting in debris build-up on the probes.

In fact, the problem of debris build-up will occur with almost any type of probe that is used very close to or touching a surface and will also occur on many other types of surfaces, such as semiconductor wafers or pieces of glass.

One technique for solving the problem of a debris build-up on a probe is to simply replace the probe when image resolution has degraded below a tolerable level. Although this solves the debris build-up problem, it is an expensive solution.

A more practical and less expensive approach, is to remove debris build-up from a probe or other surface using a light source, such as ultra violet (UV) light in a UV light chamber. Although this approach works, the UV light UV light can damage light sensitive tip coatings and may cause the surface being cleaned to degrade.

Another approach is to prevent debris build-up from occurring in the first place by doing all of the imaging with the probe in a solvent. The solvent solubilizes any debris on the tip so that build-up does not occur. Unfortunately, for many types of experiments and applications a solvent can not be used because it may destroy the sample being examined.

Yet another technique for removing debris buildup specifically in STM probes is to generate an electric field in the STM probe itself so that the STM probe is somewhat "self-cleaning". Again this technique works, but each time it is used a portion of the probe is also removed. As a result, the probes wear out relatively quickly and must be replaced. Additionally, for this technique to work, the probe itself must be conductive, e.g., STM probes are conductive, but AFM probes are not.

Yet another technique is a procedure known as glow discharging where the surface to be cleaned is placed in a sealed chamber and a plasma is generated. The plasma is thought to neutralize the charges on the surface of the sample. Again this technique works, however it requires a chamber in which a plasma bath is generated and also requires the creation of a vacuum in the chamber or the introduction of ionizable gases in the chamber. The chamber is bulky and, thus not portable, and also is expensive.

SUMMARY OF INVENTION

One embodiment of a decontamination device for a surface, such as a probe, and method thereof in accordance with the present invention includes a first electrode, a second electrode, and a transformer. The first electrode comprises a housing with an opening. The second electrode has an elongated-shape which tapers to a point at one end and that one end is positioned adjacent to the opening. The transformer is mounted in the housing and has a first and a second pair of leads. The first pair of leads may be coupled to a power source. One of the second pair of leads is coupled to the first electrode and the other of the second pair of leads is coupled to the second electrode. To clean a surface, the surface is placed adjacent to the point at one end of the first electrode and the device is turned on for a preset period of time to generate free radicals, such as ozone plasma, in a localized area which remove debris build-up on the surface.

In an alternative embodiment, the device comprises a housing, a first electrode, a second electrode, and a transformer. The housing has a handle coupled to one end of an elongated section, the other end of the elongated section having an opening. The first and second electrodes are mounted in and extend along the length of the elongated section. The first and second electrodes are substantially encased in a layer of insulation except at opposing ends. The transformer is mounted in the handle and has a first and a second pair of leads. The first pair of leads is to be coupled to a power source. One of the second pair of leads is coupled to one end of the first electrode and the other of the second pair of leads is coupled to one end of the second electrode. The other end of the first and second electrodes are located in the opening in the other end of the elongated section and are spaced a first distance apart. To clean a surface, the other end of the elongated section is placed adjacent to the surface to be cleaned and the device is turned on for a preset period of time to generate free radicals, such as ozone plasma, in a localized area which remove debris build-up on the surface.

The decontamination device provides several advantages including providing a device and method for effectively removing debris build-up from probes and other surfaces with minimal, if any, removal of the surface being cleaned. The device is easy to use and is portable. Additionally, since the device generates a localized plasma, the plasma can be targeted at just the surfaces to be cleaned without contacting adjacent surfaces. As a result, the adjacent surfaces do not degrade from unnecessary exposure to the plasma (as occurs when surfaces are placed in plasma chambers). Further, the present invention is designed to function at atmospheric pressure and thus does not need any expensive and bulky chambers to alter the pressure.

BRIEF DESCRIPTION OF THE DRAWINGS

These and other features and advantages of this invention will be evident from the following detailed description of preferred embodiments when read in conjunction with the accompanying drawings in which.

DETAILED DESCRIPTION

Figure 1:
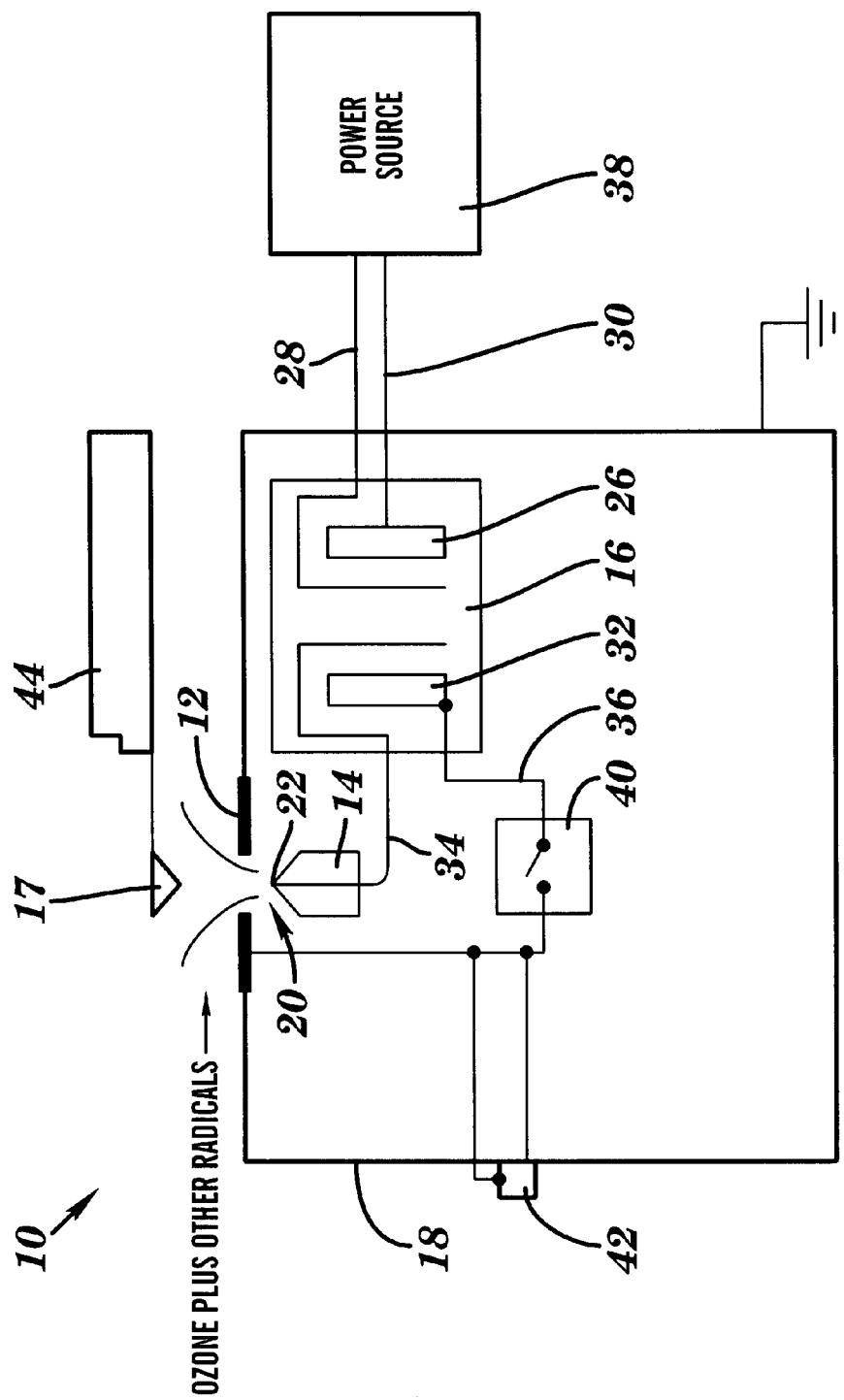
FIG. 1 is a schematic diagram of one embodiment of a decontamination device in accordance with the present invention.

A decontamination device 10 for cleaning surfaces of debris in accordance with the present invention is illustrated in FIG. 1. The decontamination device 10 comprises a first electrode 12, a second electrode 14, and a transformer 16. The decontamination device 10 provides several advantages, including providing a device 10 and method for effectively removing debris build-up from a probe 17 or other surfaces with minimal, if any, removal of the probe 17 or other surface being cleaned.

Referring to FIG. 1, in this particular embodiment first electrode 12 is a plate mounted on the housing 18. The plate, which is about a two inches square in this embodiment, has an opening 20, which in this embodiment is substantially circular with a half-inch diameter, although the size of the plate and opening 20 can vary as needed or desired. The housing 18 itself could also be constructed to function as the first electrode 12 if desired. First electrode 12 is made of any suitable conductive material, such as metal.

Additionally in this particular embodiment, the second electrode 14 is a needle or other elongated member which tapers to a point 22 at one end. The tapered or sharp point 22 at one end of the second electrode 16 is used because it enables a higher concentration of the electric field to be obtained at that point 22 and thus superior generation can also be obtained at that point 22. Like first electrode 12, second electrode 14 is made of any suitable conductive material, such as metal.

The second electrode 14 is positioned in the housing 18 with the tapered or sharp point 22 positioned in and spaced from the sides of the opening 20 by a first distance. The relatively close spacing of the first and second electrode 12 and 14, i.e. the first distance, permits the generation of an intense electric field between the first and second electrodes 12 and 14, without arcing or sparking which could damage a probe 17 in the vicinity. The intense electric field generated between the first and second electrodes 12 and 14 results in the creation of a plasma at atmospheric pressure.

By way of example only, to remove debris buildup on a probe 17, such as an AFM probe or an STM probe, the first and second electrodes 12 and 14 will typically be spaced between about 1/16 of an inch and 1/4 of an inch away from the sides of the opening 20 and a voltage ranging between about 2000 volts and 3000 volts at about 20 milliamps will be applied to the first and second electrodes 12 and 14 to generate an electric field ranging from about fifteen killivolts/meter to fifty killivolts/meter. The localized plasma which is generated that is useful to clean the probe 17 or other surface typically extends out about an inch from electrode 14.

Although first and second electrodes 12 and 14 are illustrated as a plate with an opening 20 and a needle, first and second electrodes 12 and 14 can be designed in many different shapes and sizes to accommodate different types of surfaces which may need to have debris build-up cleaned. For example, first and second electrodes 12 and 14 could each be a plate without any openings (not shown). In such an embodiment, however, the plasma generation would not be as concentrated as it is with one electrode 14 having a sharp point.

Figure 2:
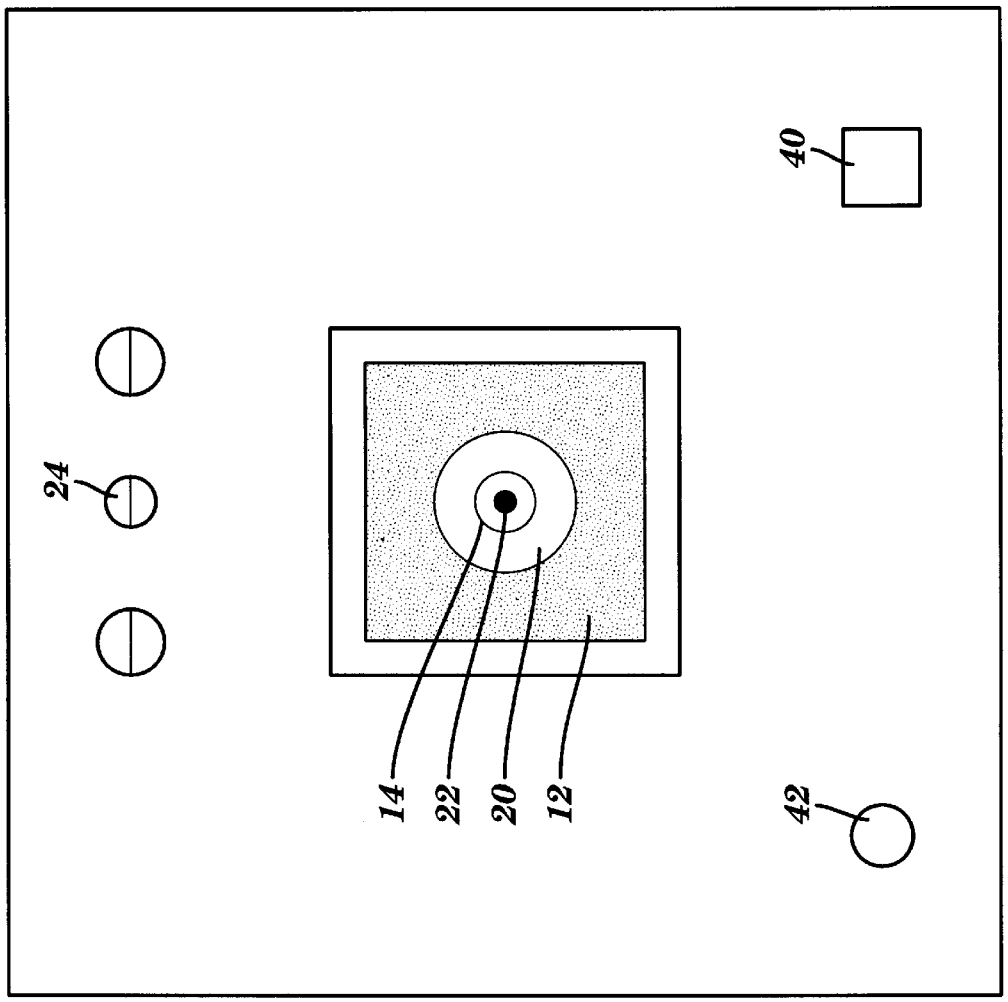
FIG. 2 is a top view of the decontamination device shown in FIG. 1.
Figure 3:
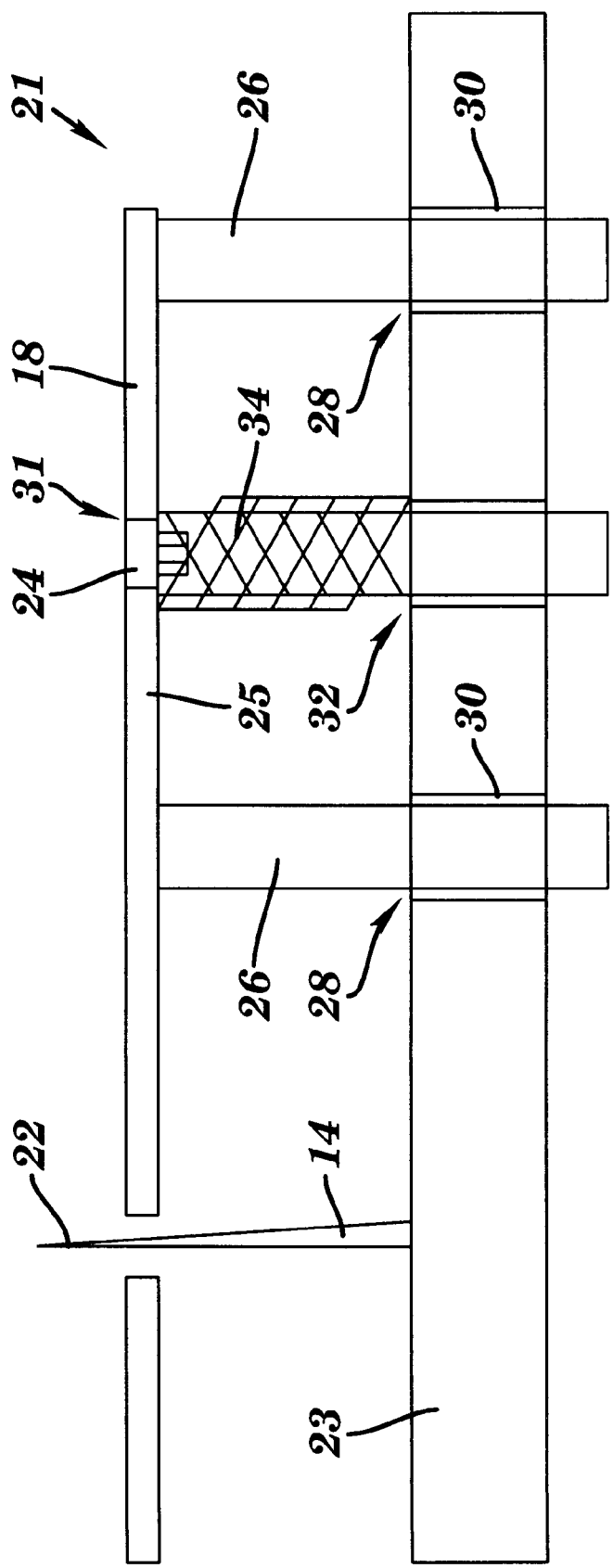
FIG. 3 is a partial, cross-sectional view of the decontamination device illustrating the height adjustment system.

Referring to FIGS. 2 and 3, an optional position or height adjustment system 21 for electrode 14 is mounted in housing 18. The height adjustment system 21 includes a height adjustment arm 23, an adjustment screw 24, and a pair of sliding shafts 26. The base of electrode 14 is mounted proximate one end of arm 23. One end of each of the shafts 26 is mounted to the inside of the roof 25 of housing 18 and each shaft 26 extends down from the roof 25 into an opening 28 in arm 23. A bushing 30 lines each of the openings 28.

Each of the shafts 26 is designed to slide in the openings 28 with the bushings 30. The adjustment screw 24 extends through an opening 31 in the roof of housing 18 and is threaded into a threaded opening 32 in arm 23 between openings 28. A biasing spring 34 is seated on adjustment screw 24 and extends between arm 23 and housing 18. The biasing spring 34 maintains tension between roof 25 of housing 18 and arm 23.

The height adjustment system 21 can move the tapered or sharp point 22 of second electrode 14 in the opening 20 above and below the plane of plate which forms first electrode 12. By turning the screw 24 to thread it further into threaded opening 32, the other end of arm 23 is pulled up towards roof 25 and tapered or sharp point 22 is pulled down. By turning the screw 24 to start to remove screw 24 from threaded opening 32, the other end of arm 23 is pushed down away from roof 25 and tapered or sharp point 22 is pushed up. With the height adjustment system 21, the tapered or sharp point 22 of second electrode 14 can be placed in the best position relative to first electrode 12 to generate the strongest electric field and thus the most free radicals. Although only the second electrode 14 has a height adjustment system 21, both the first and second electrode 12 and 14 could be equipped with height adjustment systems or both could be stationary, if needed or desired. Additionally, although one specific type of height adjustment system 21 is shown, any type of height adjustment system could be used.

Referring back to FIG. 1, transformer 16 has a first coil 26 with a first pair of leads 28 and 30 and a second coil 32 with a second pair of leads 34 and 36. The first pair of leads 28 and 30 may be coupled to any type of suitable power source 38, such as a standard wall outlet or a battery. One of the second pair of leads 34, preferably the positive lead, is coupled to the second electrode 14 and the other one of the second pair of leads 36, preferably the negative lead, is coupled to the first electrode 12. In this particular embodiment, transformer 16 is a step-up transformer which converts a low voltage, high current power source 38 to a high voltage, low current power source. By way of example only, if first pair of leads 28 and 30 are coupled to a standard wall outlet, transformer 16 will convert the input 115 volts and 15 amps to about 2,000 volts and 20 milliamps.

An on/off switch 40 is coupled in series in one of the second pair of leads 36 and is mounted to the housing 18. Although not shown, on/off switch 40 could be coupled in at other locations, such as in series with second lead 38 or in series with one of the first pair of leads 28 or 30. When the on/off switch 40 is closed, the circuit is completed and the first and second electrodes 12 and 14 are coupled to the output of second coil 32 of transformer 16.

Additionally, an optional indicator light 42 is also coupled in parallel with second pair lead 36. Again although not shown, indicator light 42 could be coupled in at other locations, such as in parallel with second lead 38 or in parallel with one of the first pair of leads 28 or 30. When on/off switch 40 is closed, indicator light 42 is on thus indicating that transformer 16 is on. The indicator light 42 is mounted to housing 18.

The decontamination device 10 may also include a holder 44 for securing a probe 17 to be cleaned. Although not shown, the holder 44 may be mounted to the housing 18. When a probe 17 is secured in the holder 44, the tip of the probe 17 is positioned to be in the region of the device 10 where free radicals, such as ozone were being generated, i.e. at point 22. Since the device 10 generates a localized plasma, only the portion of the probe 17 or other surface to be cleaned is exposed to the plasma. As a result adjacent surfaces to the probe 17 or other surface being cleaned are not degraded by exposure to the plasma.

Figure 4:
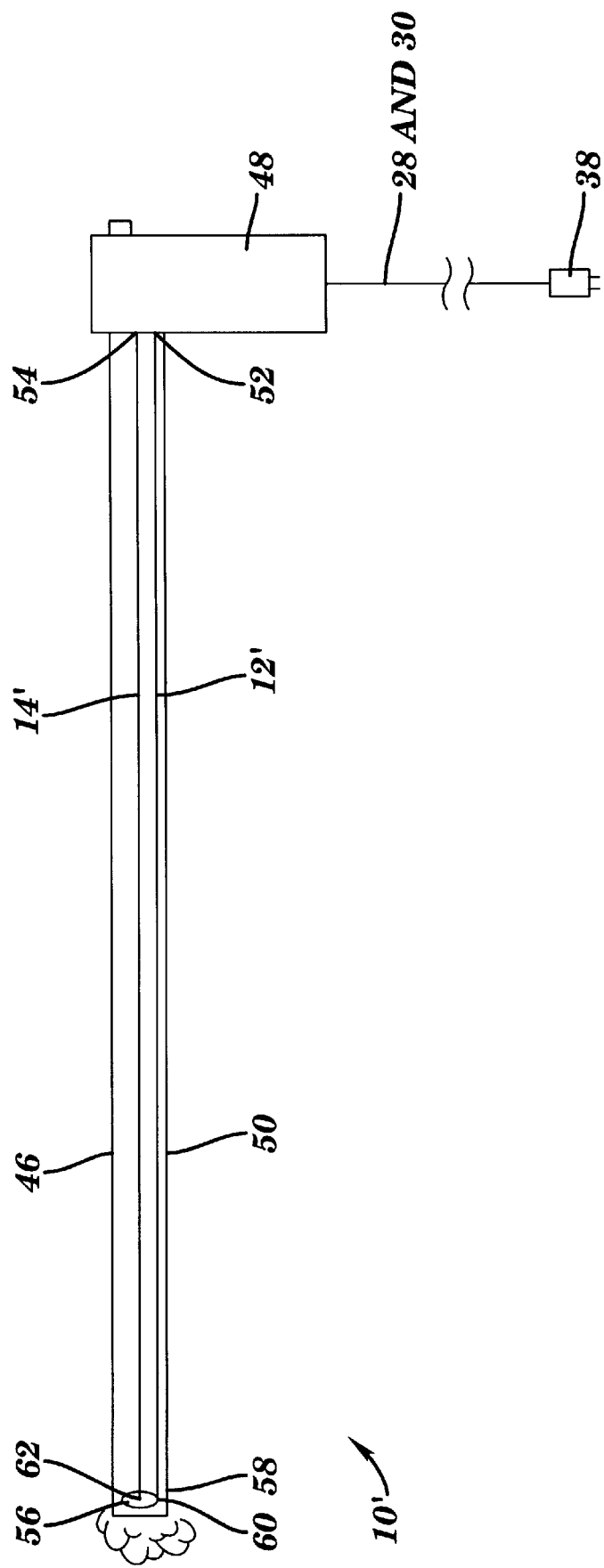
FIG. 4 is a cross-sectional, side view of an alternative embodiment of a decontamination device in accordance with the present invention.

An alternative embodiment for decontamination device 10', which has a "wand" shape, is illustrated in FIG. 4. Elements in FIG. 4 which are identical to those in FIG. 1 have the same numerical designation and will not be described in detail again. In this embodiment, the device 10' has a housing 46 with a handle 48 and an elongated section 50. The transformer 16 is located in the handle 48 of the wand. The first set of leads 28 and 30 from the first coil 26 extend from transformer 16 and can be coupled to a suitable power source 38, such as a standard wall outlet or a battery. The second set of leads 34 and 36 from the second coil 32 of transformer 16 are each coupled to one end 52 and 54 of the first and second electrodes 12' and 14'. First and second electrodes 12' and 14' comprise wires surrounded by insulation which extend along the length of elongated section 50 from handle 48 to an opening 56 in the other end 58 of elongated section 50. The other ends 60 and 62 of the first and second electrodes 12' and 14' in the opening 56 are stripped of insulation and are spaced a first distance apart. The relatively close spacing of the first and second electrodes 12' and 14' permits the generation of an intense electric field between the first and second electrodes 12' and 14', without arcing or sparking which could damage a probe or other surface being cleaned in the vicinity. The intense electric field generated between the first and second electrodes 12' and 14' results in the creation of a plasma at the end 58 of the wand. A switch 40 (not shown in FIG. 4) may be coupled in series with one of the second pair of leads 34 and 36.

By way of example only, to remove debris build-up on a surface, such as a semiconductor wafer or a piece of glass, the first and second electrodes 12' and 14' at the other end 58 of the elongated section 50 of the "wand" shown in FIG. 4 will typically be spaced between about 1/16 of an inch and 1/4 of an inch apart and a voltage ranging between about 2,000 volts and 3,000 volts at about 20 milliamps will be applied to the first and second electrodes to generate an electric field ranging from about fifteen killivolts to fifty killivolts. The localized plasma which is generated that is used to clean the probe 17 or other surface typically extends out about an inch from electrode 14'.

The operation of the decontamination devices 10 and 10' described above will be described with reference to FIGS. 1–4. To start the decontamination device 10 or 10', switch 40 is closed coupling first and second electrodes 12 and 14 or 12' and 14' to the output of second coil 32 of transformer 16. The charge in the first and second electrodes 12 and 14 or 12' and 14', which are spaced a first distance apart, generates an intense electric field.

If a source of free radicals is present in the space between first and second electrodes 12 and 14 or 12' and 14' when the electric field is generated, free radicals in the form of a plasma are generated. For example, if oxygen is present in the space, the electric field between electrodes 12 and 14 or 12' and 14' strip electrons off of any oxygen that is present in the space to produce ozone or ozone plasma at the end of electrodes 12 and 14 or 12' and 14' which diffuses from the electrodes 12 and 14 or 12' and 14'. The portion of the plasma which is generated and useful to clean probe 17 or other surface extends out about an inch from electrode 14 or 14'.

The atmosphere between the two electrodes 12 and 14 or 12' and 14', i.e. in the space or air gap, can contain any source of plasma. As discussed above, in the typical application in "regular atmospheric air", oxygen is present to generate an ozone plasma. Alternatively, other types of gas, such as pure oxygen, pure nitrogen or some other ionizable element or compound that can generate a specific kind of free radical, could also be used.

If the device 10 has a height adjustment system 21, the system 21 can be used to adjust the height of the second electrode 14 until it is at an optimum plasma generating position. As discussed earlier, the adjustment is made by turning screw 24 into threaded opening 32 to lower electrode 14 or by turning screw 24 out of threaded opening 32 to raise electrode 14. The optimum position can be detected visually by looking for blue plasma, by smelling for ozone, or by monitoring the region with an electronic ozone detector/sensor.

Either the probe 17 or other surface to be cleaned is placed in the free radical plasma being generated by device 10 or 10' or the plasma being produced by device 10 or 10' is placed on the probe 17 or other surface being cleaned. The plasma, which is generally a free radical such as ozone, will react with and remove debris, particularly organic debris in the case of free radicals, from the surface of the sample. Typically, the probe 17 or surface being cleaned is allowed to react with the ozone being generated for about thirty seconds to one-hundred-and-twenty seconds and then the probe or surface is removed. The probe 17 or surface being cleaned should be removed before the switch 40 is opened, turning off the power, because when the transformer 16 is turned off there can be a discharge that could generate a spark and damage the probe 17 or surface.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention.

We claim:

1. A method for decontaminating a portion of an object, the method comprising the steps of:

providing a housing with a first electrode positioned inside the housing and spaced a first distance from an opening in a plate which forms a second electrode and is located on the housing, the first electrode having an elongated-shape which tapers to a point adjacent the opening;

coupling power to the first and second electrodes;

generating a localized region of free radicals adjacent to the point of the first electrode; and subjecting only the portion of the object to be decontaminated in the region of the free radicals for a preset period of time to decontaminate that portion of the object without degrading adjacent portions of the object.

2. The method according to claim 1 wherein the preset period of time ranges from thirty seconds to one-hundred-and-twenty seconds.

3. The method according to claim 1 wherein the first distance is about 1/16 of an inch to 1/4 of an inch.

4. The method according to claim 1 further comprising adjusting the spacing between the first electrode and the second electrode with an adjustment assembly to adjust the generation of free radicals.

5. A method for decontaminating a portion of an object, the method comprising the steps of:

providing a housing with an elongated section which has a pair of ends with an opening at one of the ends of the elongated section of the housing, first and second electrodes being insulated except for opposing ends and mounted in and extending along the length of the elongated section of the housing, one end of the first and second electrodes located in the opening in the one end of the elongated section and spaced a first distance apart;

coupling power to the first and second electrodes;

generating a localized region of free radicals adjacent to the one and of the elongated section of the housing; and positioning the one end of the elongated section of the housing adjacent to only the portion of the object to be decontaminated for a preset period of time to decontaminate that portion of the object without degrading adjacent portions of the object.

6. The method according to claim 5 wherein the preset period of time ranges from thirty seconds to one-hundred-and-twenty seconds.

7. The method according to claim 5 wherein the first distance is about 1/16 of an inch to 1/4 of an inch.

8. The method according to claim 5 wherein the power is coupled to the first electrode and the second electrodes through a transformer located in a handle of the wand, the handle is connected adjacent to an opposing end of the elongated section.

9. A method for decontaminating a portion of an object, the method comprising the steps of:

providing a portable housing with a first electrode and a second electrode, the first electrode positioned inside the housing and located a first distance from a second electrode;

coupling the power to the first electrode and the second electrode;

generating a region of free radicals adjacent to the first electrode;

adjusting the first distance between the first electrode and the second electrode with an adjustment assembly to adjust the generation of free radicals; and subjecting only the portion of the object to be decontaminated in the region of free radicals for a preset period of time to decontaminate that portion of the object without degrading adjacent portions of the object.

10. The method according to claim 9 wherein the preset period of time ranges from thirty seconds to one-hundred-and-twenty seconds.

11. The method according to claim 9 wherein the first distance is about 1/16 of an inch to 1/4 of an inch.

12. The method according to claim 9 wherein the power is coupled to the first electrode and the second electrodes through a transformer.

13. The method according to claim 9 wherein the first electrode has an elongated-shape which tapers to a point adjacent an opening in a plate which forms the second electrode.

* * * * *